Patented Dec. 19, 1939

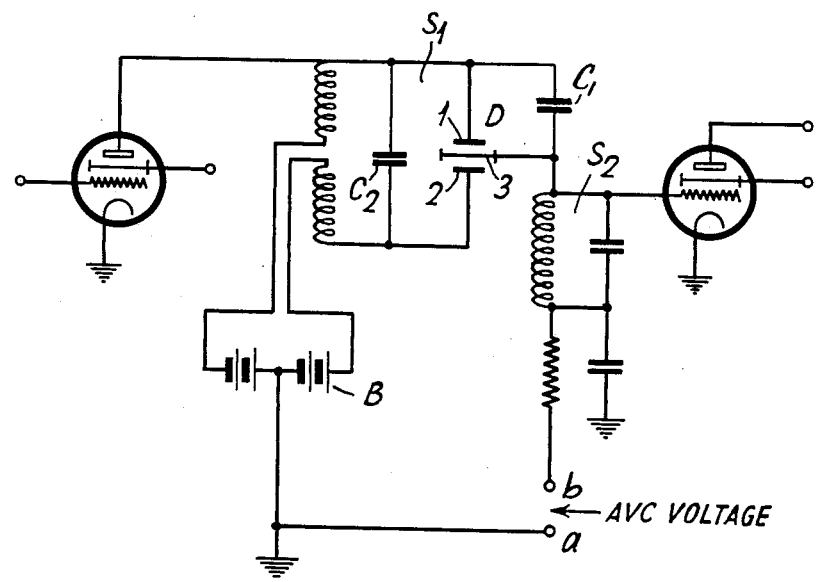

2,183,632

UNITED STATES PATENT OFFICE 2,183,632

CAPACITIVE COUPLING ARRANGEMENT

Karl Wilhelm, Berlin-Tempelhof, Germany, assignor to Telefunken Gesellschaft für Drahtlose Telegraphie m. b. H., Berlin, Germany, a corporation of Germany Application June 30, 1938, Serial No. 216,761
In Germany July 1, 1937

7 Claims. (Cl. 250—20)

It is known to employ as variable capacity a condenser for the tuning and for the coupling of oscillatory circuits which condenser is designed in the manner of an electro-static loudspeaker and whose capacity is controlled by varying a direct potential applied thereto. The capacitive variation is obtained in this case just as in the case of an electro-static loudspeaker by a variation of the distance between the layers caused by the influence of the applied direct potential.

At variation of the capacitive coupling of two oscillatory circuits the difficulty is encountered that as in any capacitive coupling the change in the coupling entails also a detuning of the oscillatory circuits. This detuning could be overcome by additional controlled condensers, or by employing a bridge circuit whose branches contain at least two controlled condensers. As compared with these measures the means required are reduced in numbers when applying the present invention.

The invention resides in that in parallel to the one oscillatory circuit a condenser is placed having two fixedly arranged layers biased by a direct potential, and an intermediate foil connected to a point of the second oscillatory circuit in which an alternating potential appears, and that the control potential is applied to a point between the foil and a corresponding central point of the direct potential.

Hence, only a single differential condenser is employed which corresponds to an electro-static loudspeaker having two fixed layers and an intermediate moving layer. In this connection the phenomenon is put to use that at slight displacements of the movable electrode only an unimportant capacity variation occurs between the two fixed electrodes since the capacitive increase of the one condenser half is approximately equal to the capacitive decrease of the other condenser half.

Aside from the obtained freedom from detuning despite the unimportant requirements, the present invention has the further advantage that the value of the capacities of the differential condenser is independent of variations in the biasing voltage source.

The invention will now be described in greater detail in reference to the accompanying figure given by way of example. The two oscillatory circuits $S_1$ and $S_2$ are coupled by means of the differential condenser D comprising two fixed plates or layers 1 and 2 and a movable plate or layer 3 in the form of a foil and subjected to the influence of the control potential. At a place between the fixed layers 1 and 2 the potential of a direct voltage source B is applied for increasing the sensitivity, in that this direct potential is applied across chokes or as shown in the figure by splitting up the coil of the oscillatory circuit. The control potential is applied between the points $a$ and $b$.

In the center position of the foil the coupling of the oscillatory circuits would have zero value if the coil of the oscillatory circuit would have in its center high-frequency potential relative to the foil 3. The influence of the control potential has the effect that the capacities between 1 and 3 and between 3 and 2 vary in the opposite sense so that the layer 3 has a high-frequency potential relative to ground. Then the oscillatory circuit $S_2$ receives a high-frequency potential. By choosing a corresponding place for the tap points at the circuit coil or by displacing the movable layer out of the central position it can be accomplished that the control potential causes a coupling action which is looser or closer than the coupling action in the zero position. The same condition can be brought about by superposing on the control potential a direct potential of opposite direction. Since in general in the position for loosest coupling, the coupling is not to be zero, a certain minimum coupling can be obtained by means of the condenser $C_1$. A condenser $C_2$ is to be placed in parallel to the coil if the differential condenser is insufficient to serve as tuning capacity.

It is advisable so to adapt the arrangement that the minimum coupling can be provided without control potential and that as control potential the difference between the volume control potential and a potential is used which corresponds to the power of the transmitter with transmission close by and which may be obtained for instance by detection of a high disturbance note of 9 kc. appearing in the audio-frequency part. Then an increase in the volume control potential when receiving a weak transmitter entails an increase in the band width, whereas, an increase in the other control potential causes a decrease in the band width.

I claim:

1. In combination with a pair of cascaded signal oscillatory circuits, the first of said circuits including a coil, a condenser in shunt with the coil and consisting of a pair of relatively fixed spaced plates and a foil intermediate said plates, said foil being connected to the second of said circuits, a source of direct current potential connected between said plates and establishing them at different potentials, and means connected between said foil and an intermediate point of said potential source for varying the direct current potential of said foil.

2. In combination with a pair of cascaded signal oscillatory circuits, the first of said circuits including a coil, a condenser in shunt with the coil and consisting of a pair of relatively fixed spaced plates and a foil intermediate said plates, said foil being connected to the second of said circuits, a source of direct current potential connected between said plates and establishing them at different potentials, and means connected between said foil and an intermediate point of said potential source for varying the direct current potential of said foil, said last means being responsive to the signal amplitude.

3. In combination with a pair of cascaded signal oscillatory circuits, the first of said circuits including a coil, a condenser in shunt with the coil and consisting of a pair of relatively fixed spaced plates and a foil intermediate said plates, said foil being connected to the second of said circuits, a source of direct current potential connected between said plates and establishing them at different potentials, and means connected between said foil and an intermediate point of said potential source for varying the direct current potential of said foil, said last means being a source of signal-derived potential which is dependent on the strength of an adjacent carrier.

4. In combination with a tuned signal circuit comprising a coil in shunt with a condenser of the type including a pair of spaced plates, means for establishing the plates at different direct current potentials, a second tuned signal circuit, means for coupling said signal circuits comprising a third plate interposed between said pair of plates and connected to a point of signal potential of the second circuit, and means for adjusting the magnitude of said coupling means comprising a source of variable direct current potential connected to said third plate.

5. In combination with a tuned signal circuit comprising a coil in shunt with a condenser of the type including a pair of spaced plates, means for establishing the plates at different direct current potentials, a second tuned signal circuit, means for coupling said signal circuits comprising a third plate interposed between said pair of plates and centrally thereof and connected to a point of relatively high signal potential of the second circuit, and means for adjusting the magnitude of said coupling means comprising a source of variable direct current potential connected to said third plate.

6. In combination with a tuned signal circuit comprising a coil in shunt with a condenser of the type including a pair of spaced plates, means for establishing the plates at different direct current potentials, a second tuned signal circuit, means for coupling said signal circuits comprising a third plate interposed between said pair of plates and connected to a point of signal potential of the second circuit, and means for adjusting the magnitude of said coupling means comprising a source of signal-responsive variable direct current potential connected to said third plate.

7. In combination with a tuned signal circuit comprising a coil in shunt with a condenser of the type including a pair of spaced plates, means for establishing the plates at different direct current potentials, a second tuned signal circuit, means for coupling said signal circuits comprising a third plate interposed between said pair of plates and connected to a point of signal potential of the second circuit, and means for adjusting the magnitude of said coupling means comprising a source of variable direct current potential connected to said third plate, said variable source consisting of an automatic volume control circuit.

KARL WILHELM.